H. T. HOLTON & W. J. JEWELL.
STALK CUTTER.
APPLICATION FILED JAN. 13, 1915.
1,169,156.
Patented Jan. 25, 1916.
2 SHEETS—SHEET 1.
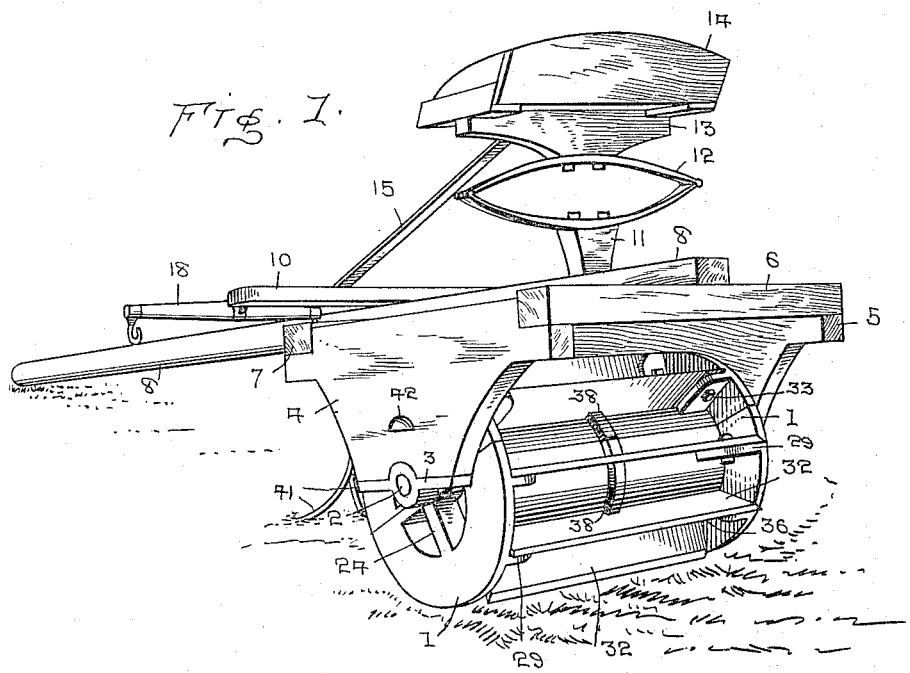
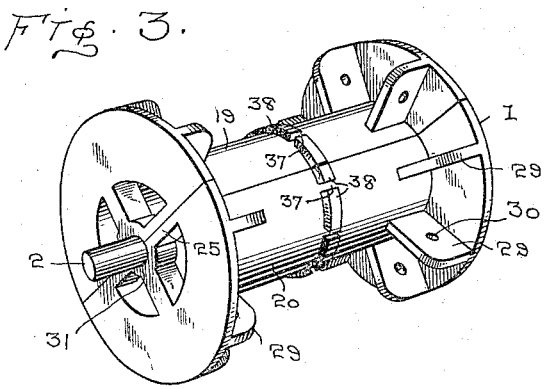

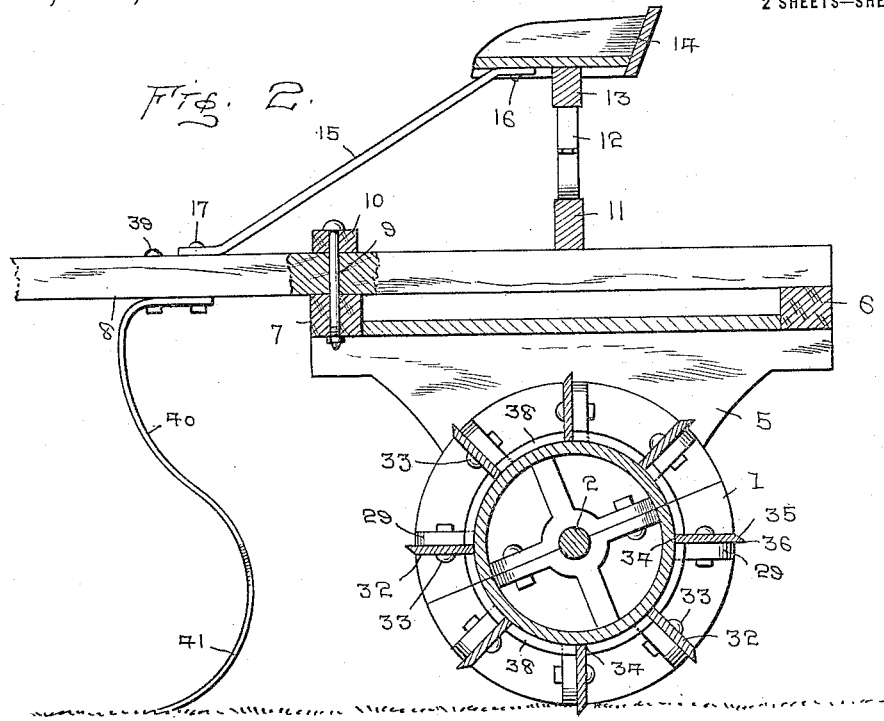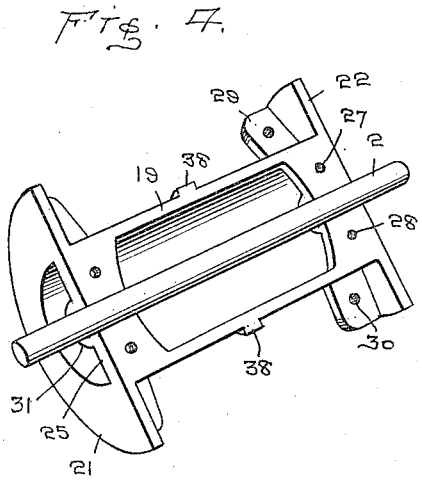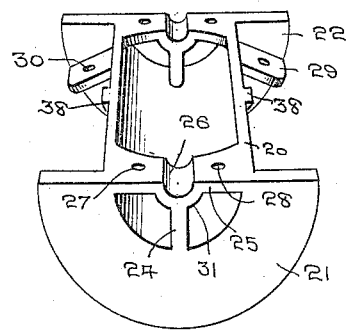

UNITED STATES PATENT OFFICE.

HENRY T. HOLTON AND WILLIAM J. JEWELL, OF FITZGERALD, GEORGIA.

STALK-CUTTER.

1,169,156.  Specification of Letters Patent.  Patented Jan. 25, 1916.

Application filed January 13, 1915. Serial No. 2,011.

*To all whom it may concern:*

Be it known that we, HENRY T. HOLTON and WILLIAM J. JEWELL, citizens of the United States, residing at Fitzgerald, in the county of Ben Hill and State of Georgia, have invented certain new and useful Improvements in Stalk-Cutters; and we do hereby declare the following to be a full, clear, and exact description of the invention, such as will enable others skilled in the art to which it appertains to make and use the same.

This invention relates to stalk cutters and has as its primary object, the provision of a device that is easy to assemble, simple in construction, strong and durable in operation and one that will not clog.

Another object of this invention resides in the provision of a stalk cutter having means upon the drum thereof for reinforcing and preventing the buckling of the cutting blades. And another object of this invention resides in the provision of means upon the stalk cutter in advance of the cutting blades for positioning the stalks in the path of the blades for the more efficient chopping of the stalks.

With these and other objects in view as the specification is developed, we shall now proceed to describe our invention in which the drawings show a preferred embodiment of the invention, but we do not desire to be limited to the specific form or construction shown, but claim all possible modifications in the scope of the claims appended hereto.

Similar characters of reference refer to similar parts throughout the specification and drawings, in which, Figure 1 is a perspective elevation of the device in assembled form. Fig. 2, a sectional elevation in assembled form. Fig. 3, a perspective view of the drum as mounted upon the axle but with the cutter blades removed. Fig. 4, a perspective view of one section of the drum showing the manner of its mounting upon the axle. Fig. 5 is a view in perspective of another section of the drum.

In the drawings, Figs. 1 and 2, 1 is the drum mounted upon the axle 2, said axle being rotatably seated in bearings 3, which support the standards 4 and 5. These standards in like manner support cross beams 6 and 7, the cross beam 6 spanning the rear of the standards and the cross beam 7 spanning the front of the standards. These cross beams pivotally support a tongue 8, said tongue being pivoted to the center portion of the cross beam 7 by means of a pivot bolt 9, this pivot bolt running through the cross beam 7, the tongue 8 and a double tree 10, which is likewise pivotally mounted by the pivot bolt. Mounted upon the tongue 10 is a standard 11 to which is bolted an ordinary strap spring 12. To the top portion of this strap spring 12 is bolted a seat standard 13 to which is rigidly attached the seat 14 as shown in Figs. 1 and 2 of the drawings. It can readily be seen from this construction that the seat will move with the tongue and will therefore always directly face the direction in which the stalk cutter is being pulled. To further support and brace the seat 14, a brace rod 15 is bolted to the under portion of the seat as at 16, at one end, and to the tongue 8 as at 17, at the opposite end. This gives a strong and durable, and yet springy seat. The usual swingle trees 18 are attached to the double tree 10 as shown in Fig. 1.

Another feature of the invention resides in the drum 1 which is formed in two sections 19 and 20, section 19 being shown in Fig. 4 and the section 20 in Fig. 5, said sections being counter parts of each other and comprising semi-spherical flanges 21 and 22 which are connected by the semi-spherical body portions 19 and 20. Spokes 24 run from the flanges at the junction point of the body portions 19 and 20 into approximately the central point where it meets a second spoke device 25 which runs at approximate right angles thereto. At the meeting point, a groove or axle bearing 26 is met and through the spoke 25 are apertures or bolt holes 27 and 28. On the inside surfaces of each of the flanges 21 and 22 and at right angles thereto, are a multiplicity of cutter flanges 29 each having an aperture or bolt hole 30 running centrally therethrough. Each section is a counter part of the other and when assembled together form a complete axle bearing as at 31 in Fig. 3 and likewise the two spokes 25 when bolted together form a complete spoke. This gives a complete drum-like structure and is thoroughly braced in every direction. Cutter bars 32 are bolted by means of a bolt 33 or other suitable fastening means to the cutter flanges 29, the bolts or fasteners 33 running through the bolt holes 30 for this purpose. The rear edges 34 of the cutters abut against the body portions 19 and 20 of the drum, while the central portions thereof are snugly seated within the spaces 37 between the ends of the reinforcing and spacing blocks 38 formed upon the body portions 19 and 20 of the drum for preventing the cutter bars 32 from buckling at their central portions when contacting with obstructions which may be upon the surface of the ground. The front edges 35 of the cutter bars 32 are beveled, thereby giving a sharp cutting edge 36, which projects slightly beyond the periphery of the flanges 21 and 22.

Secured upon the under side of the tongue 8 by the bolts 17 and 39 is the resilient S-shaped spring member 40, provided at its lower end with the laterally diverging prongs or tines 41. The spring member 40 is positioned sufficiently in advance of the drum 1, in order that the prongs or tines 41 will engage any stalks that may have lodged across the rows, thus turning the stalks lengthwise of the device and transversely of the cutter blades 32, whereby none of the stalks may escape being thoroughly chopped.

In assembling the device, the axle 2 is mounted in the axle bearing 26 of the section 19 and the section 20 is then secured upon the section 19, heretofore described. The axle bearings 3 are then placed upon the ends of the axle 2 and attached to the respective standards 4 and 5. The cross beams 6 and 7 and tongue 8 upon which is mounted the seated structure are then secured to the standards 4 and 5, as heretofore described.

The only parts of our device that require lubrication are the ends of the axle 2 within the bearings 3, and for lubricating these parts, the oil holes 42 are formed in the lower ends of the standards 4 and 5, having suitable channels leading to the respective bearings 3 for conveying the lubricant thereto.

In the operation of the stalk cutter, the draft animals are hitched to the tongue 8 by any well known and suitable means and draw the device over the ground and through the stalks to be cut. The onward movement of the machine will bend the stalks in a well known manner as is customary by devices of this character, until the stalks are pressed between the cutting edge 36 of the cutter blades 32 and the ground, the prongs 41, in the meantime, turning the lodged stalks lengthwise of the device, when they are cut in a series of short lengths, owing to the weight of the machine pressing the cutter blades through them, thus giving a neat and finished job.

What we claim as new and desire to secure by Letters-Patent of the United States is:

1. A stalk cutter comprising a drum composed of a plurality of sections, a plurality of cutter blades attached to said drum, each section of said drum comprising a body section, end flange sections, and cutter blade flanges attached to said end flange sections, said cutter blades being attached to said cutter blade flanges.

2. In a stalk cutting device, a plurality of semi-cylindrical sections, said sections when assembled forming a complete drum, and comprising a cylindrical body section, a plurality of spoke-like sections running from the body section to a center, an axle bearing groove running longitudinally of said central spoke section, right angular extended flanges projecting from said body section at the ends thereof, and a plurality of cutter blade flanges projecting at right angles from said end flanges, and a plurality of cutter blades attached to said cutter blade flanges and having their cutting edges projecting beyond the periphery of the end flanges.

3. In a stalk cutting device, a drum-like structure comprising a plurality of sections, a plurality of spokes to each section having apertures through said spokes, a flange upon each end of said section forming a portion of a disk, a plurality of flanges projecting from each end flange having apertures centrally disposed therein, and a plurality of cutter blades attached to said last mentioned flanges through said last mentioned apertures, said sections being bolted together to form a completed drum by means of the apertures in the afore mentioned spokes.

4. In a stalk cutting device, a drum-like structure comprising a plurality of sections, a plurality of spokes to each section having apertures through said spokes, a flange upon each end of said section forming a portion of a disk, a plurality of flanges projecting from each end flange having apertures centrally disposed therein, a plurality of cutter blades attached to said last mentioned flanges through said last mentioned apertures, said sections being bolted together to form a completed drum by means of the apertures in the afore mentioned spokes, and spacing blocks arranged centrally around said drum for reinforcing said blades intermediate of their ends.

In testimony whereof we have signed our names to this specification in the presence of two subscribing witnesses.

HENRY T. HOLTON.
WM. J. JEWELL.

Witnesses:
W. C. WILKERSON,
C. A. NEWCOMER.

Copies of this patent may be obtained for five cents each, by addressing the "Commissioner of Patents, Washington, D. C."